United States Patent [19]
Noone et al.

[11] Patent Number: 5,176,389
[45] Date of Patent: Jan. 5, 1993

[54] SEGMENTED BRUSH SEAL

[75] Inventors: Lawrence E. Noone, Lyman; Leo J. Lagasse, Welles, both of Me.

[73] Assignee: United Technologies, Hartford, Conn.

[21] Appl. No.: 822,371

[22] Filed: Jan. 17, 1992

Related U.S. Application Data

[62] Division of Ser. No. 658,943, Feb. 21, 1991, Pat. No. 5,110,033.

[51] Int. Cl.⁵ ............................................. F16J 15/447
[52] U.S. Cl. ........................................ 277/53; 277/192
[58] Field of Search ................... 277/53, 192, 193, 195

[56] References Cited

U.S. PATENT DOCUMENTS 4,756,536  7/1988  Belcher .................................. 277/53
5,090,710  2/1992  Flower .................................. 277/53

FOREIGN PATENT DOCUMENTS 494348  2/1927  Fed. Rep. of Germany ........ 277/53
271844  1/1927  United Kingdom .................. 277/53

Primary Examiner—Allan N. Shoap
Attorney, Agent, or Firm—Troxell K. Snyder

[57] ABSTRACT

A segmented brush seal (10) having coaxial annular backing (20) and side (25) plates sandwiching a plurality of tightly packed, circumferentially arrayed bristles (30) which extend radially inwardly at a constant circumferential skew angle, and its method of manufacture, is disclosed. The side plate (25) has a plurality of radially inwardly extending tabs (32) each having a tab end (34) which extends proximate to an inner diameter (22) of the backing plate. The sandwiched plates (20, 25) and bristles (30) are welded together at each tab (32), wherein the resulting weld zone (50) lenghtwisely extends from the radially innermost tab end (34) to an outer circumferential weld (40) at the local bristle skew angle. The seal is then lengthwisely bifurcated through each weld zone (50) at the local bristle skew angle to produce the segmented seal (10).

3 Claims, 2 Drawing Sheets

SEGMENTED BRUSH SEAL

This is a division of application Ser. No. 07/658,943 filed on Feb. 21, 1991, now U.S. Pat. No. 5,110,033, issued May 5, 1992.

FIELD OF THE INVENTION

This invention relates to the field of brush seals, and more particularly to the application of brush seals to turbomachines.

BACKGROUND ART

Brush seals are generally useful for axially segregating a plurality of adjacent annular fluid volumes in axial flow machines. For example, an axial flow gas turbine engine typically has a plurality of such adjacent volumes wherein it is desirable to maintain predetermined fluid volumes and/or pressures during machine operation.

More particularly, a brush seal provides this segregating effect by employing a flexible partition which is circumferentially disposed about and bears against the surface of a rotatable shaft, the partition bridging the gap between the shaft and its corresponding opposing surface. Effective partitioning by a brush seal occurs over a broad operating range by accommodating thermal and centrifugal growth, thereby maintaining desired fluid volume and pressure by limiting or preventing fluid inflow or outflow across the plane of the partition.

Brush seals of the prior art have a closed annular configuration comprising a pair of annularly shaped plates which capture a plurality of tightly packed bristles therebetween. The bristles are circumferentially arrayed about the annulus such that they project radially inwardly toward the rotational axis of the seal and shaft. Likewise, the outwardly-facing bristles of an outwardly facing brush seal bear against the inner surface of a structure disposed radially outward of the seal.

According to the prior art, the brush seal is installed about a rotatable shaft by axially sliding the seal along the shaft to its designated axial location and then affixing it at that location to a static structure using an appropriate attachment and retention method. This method of installation necessitates the time-consuming removal of those shaft-disposed machine elements with their associated hardware which are located in intermediary positions between the accessible shaft end and the designated brush seal location.

SUMMARY OF THE INVENTION

It is therefore an object of the present invention to provide a segmented brush seal and manufacturing method thereof.

This and other objects will become apparent in the further course of this disclosure.

The present invention provides a segmented brush seal and its method of manufacture. This seal is comprised of two annular plates which sandwich a plurality of tightly packed bristles which radially inwardly extend toward a common axis of the plates. These bristles are arranged at a constant circumferential skew angle relative to either annular plate. In addition, the annular side plate, having an inner diameter larger than the inner diameter of the backing plate, includes a plurality of radially inwardly extending tabs which radially inwardly extend from the inner diameter. According to the present invention, these tabs extend to a diameter substantially equal to the inner diameter of the backing plate.

After coaxial sandwiching of the plates and the tightly packed bristles therebetween, the resulting assembly is then welded together at its outer circumference to effectively form a unitary brush seal. The sandwiched plates, bristles and tab of a circumferential location of the seal are then welded together, the weld extending from a radially inner end of a tab to an outermost diameter of the seal. The welded zone, produced by an electron beam welder, is substantially parallel to the local bristle skew angle. The resulting weld zone is then lengthwisely bifurcated wherein the bifurcation is substantially parallel with the bristle skew angle, and wherein a portion of the weld zone is lengthwisely retained by each resulting edge of the seal.

In a second embodiment of the present invention, a segmented brush seal is assembled as discussed above, followed by the welding of the sandwiched plates, bristles and tab at each circumferential tab location of the seal with two substantially parallel welds lengthwisely disposed from a radially inner end of the tab to an outermost diameter of the seal, wherein the welded zones on each tab are substantially parallel to the local bristle skew angle. The seal is then lengthwisely bifurcated between the welded zones, wherein the bifurcation is substantially parallel with the local bristle skew angle.

DETAILED DISCLOSURE

Figure 1:
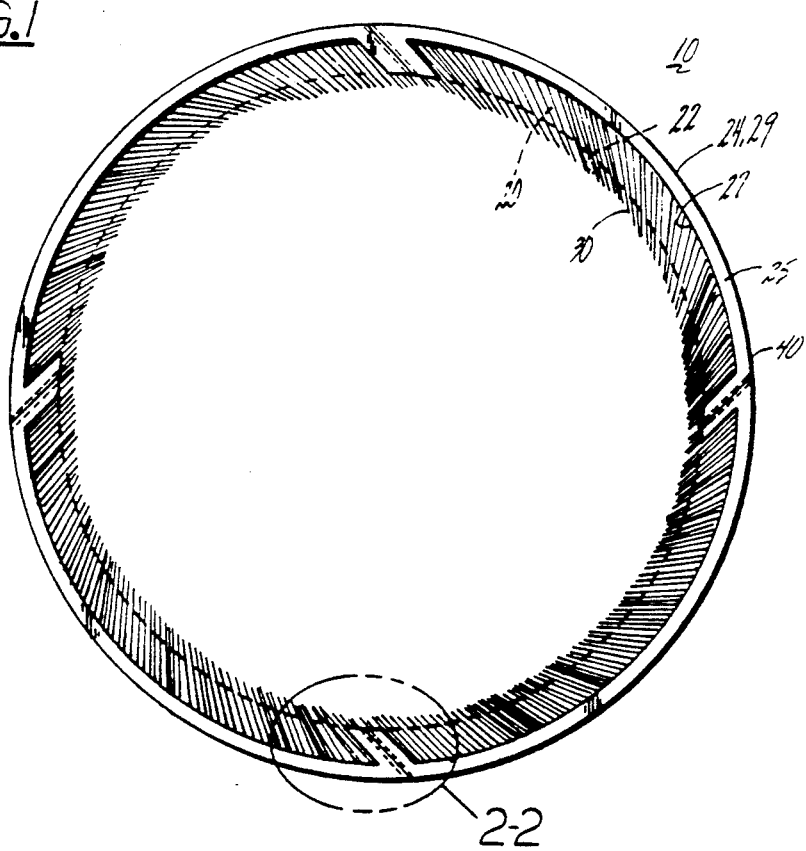
FIG. 1 is a planar view of a brush seal of the present invention.

Referring to FIG. 1, a brush seal 10 for partitioning axially adjacent annular volumes according to the present invention is shown. The brush seal 10 comprises an annular backing plate 20 axially spaced apart from an annular side plate 25, and further has a plurality of tightly packed bristles 30 sandwiched therebetween. The bristles 30 extend radially inwardly at a constant circumferential skew angle with respect to the side plate 25, and with respect to the coaxial centerlines of the backing plate and side plates 20, 25.

Figure 3:
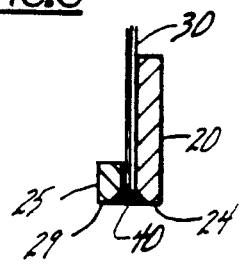
FIG. 3 is a cross-section of the seal taken through a section of FIG. 2.

The side plate 25 of one configuration has an inner diameter 27 larger than the inner diameter 22 of the backing plate 20. The outer diameters 24, 29 of the backing plate 20, and side plate 25, respectively, are dimensioned to accommodate circumferential welding of the paired outer diameters 24, 29 of the annular plates 20, 25. A cross-section of this assembly, depicted in FIG. 3, shows the side plate 25 and backing plate 20 which sandwich the plurality of tightly compacted radially inwardly-extending bristles 30 joined together by an outer circumferential weld 40 at the outer diameters 24, 29 of the backing plate 20 and side plate 25, respectively.

Figure 2:
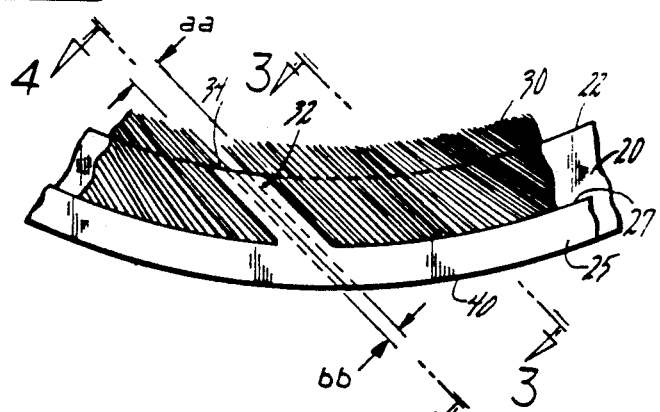
FIG. 2 is an enlarged view of a portion of the seal shown in FIG. 1.

Now referring to FIG. 2, an enlarged view of the portion of the seal shown in FIG. 1 is shown. A radially inwardly extending tab 32 lengthwisely extends inwardly from the inner diameter 27 of the side plate 25 to the inner diameter 22 of the backing plate 20 and sandwiches therebetween a plurality of tightly packed radially inwardly extending bristles 30. The tab 32 has a uniform width a—a extending from the inner diameter 27 of the side plate 25 to a radially inner tab end 34 which is an integral detail of the side plate 25.

Figure 4:
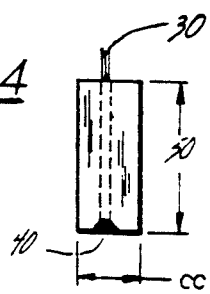
FIG. 4 is a cross-section of the seal also taken through a section of FIG. 2.

The backing plate 20 and side plate 25, with its plurality of tabs 30, are constructed of a high strength, high temperature steel alloy such as Inconel 625. According to the present invention, the sandwiched plates 20, 25, bristles 30, and tab 32, are welded together at a circumferential tab location of the seal as shown in FIG. 2. An effective weld will fuse together the plates 20, 25, bristles 30, and tab 32, with an effective weld depth c—c shown in FIG. 4. The resulting weld zone 50 lengthwisely extends from the radially inner tab end 34 to the outermost diameter 24, 29 of the seal 10, or at the resulting outer circumferential weld 40 as previously discussed. A cross-section of this welded assembly, depicted in FIG. 4, shows the lengthwisely extending bifurcated weld zone 50.

Figure 2A:
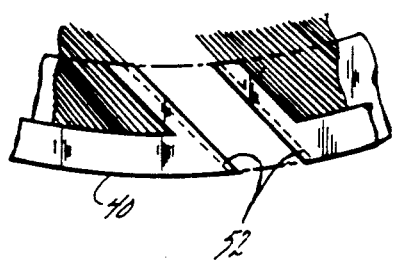
FIG. 2a is a partial view of FIG. 2 with segments spaced apart.

The weld zone 50 is created by an electron beam welder (or similar fusing method) which performs the welding operation preferably without any filler metals. The relatively narrow, deeply penetrating single pass electron beam weld of 050 inch depth, which is produced by a single or multiple passes of the welder, yields a relatively narrow weld width b—b in a lengthwise orientation between the inner tab end 34 and the circumferential weld 40 of the seal 10. Additionally, the weld zone 50 is wide enough to accommodate a subsequent bifurcation 4—4 through the weld zone 50 wherein a portion of that weld zone 50 is lengthwisely retained by each resulting edge 52. Preferably, the bifurcation 4—4 occurs through the weld zone 50 at the local bristle skew angle, thereby eliminating bristle loss beyond the immediate bifurcation region. The resulting seal edge 52 is shown in FIG. 2a.

The seal's bristles 30 are comprised of 0.0028 inch diameter steel wire, as provided by Haynes International, Kokomo, Ind. and the axial thickness of the bristle packing is approximately 0.030 inch according to industry practice. The circumferential skew angle of the bristles 30 is nominally 45 degrees to the inner diameter 27 of the side plate 25. Brush seals 10 having outer diameters in the range of 4.5 to 33.7 inches have been produced by the methods of this invention, and it is anticipated that seals falling outside of this size range will likewise be produced.

Figure 5:
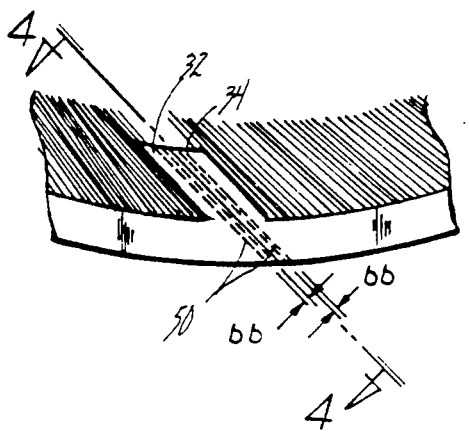
FIG. 5 shows an alternate embodiment of FIG. 2.
Figure 5A:
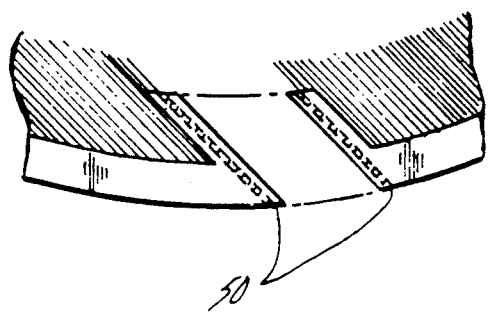
FIG. 5a is a partial view of FIG. 5 with segments spaced apart.

In an additional configuration shown in FIG. 5, a second substantially similar weld zone 50 is created at a circumferentially disposed tab 32 in a direction substantially parallel to the first weld zone 50. The seal 10 is then bifurcated through the unwelded zone disposed therebetween at the local bristle skew angle, and at each like circumferential location, to produce a segmented seal 10. FIG. 5a is a partial view of FIG. 5 with segments spaced apart.

Figure 6:
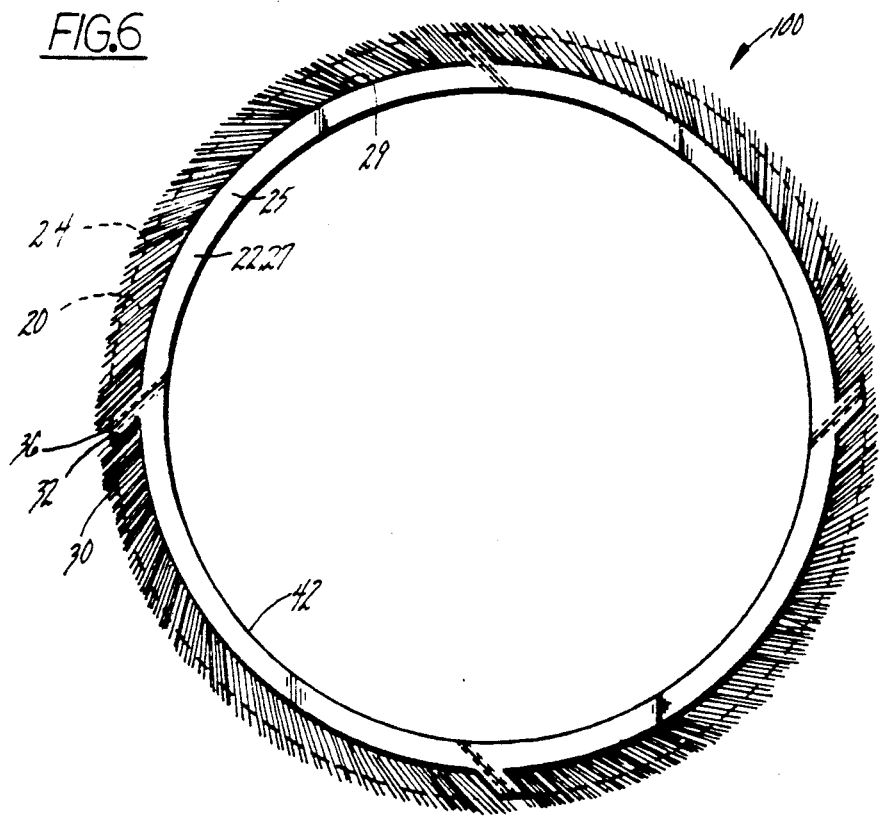
FIG. 6 is a planar view of an alternate embodiment of the present invention.

In yet another configuration, FIG. 6 shows a segmented brush seal 100 having a plurality of radially outwardly extending bristles 30, and is producible according to the methods previously discussed. This outwardly-extending brush seal 100 comprises a side plate 25 and backing plate 20 which sandwich the plurality of tightly compacted radially outwardly-extending bristles 30 which are joined together by an inner circumferential weld 42 at the inner diameters 27, 22 of the side plate 25 and backing plate 20, respectively. In this configuration, a radially outwardly-extending tab 32, which extends radially outwardly from the outer diameter 29 of the side plate 25, has an outer tab end 36 disposed to the outer diameter 24 of the backing plate 20. A weld zone 50 is then lengthwisely produced along the tab 32 from the radially outer tab end 36 to the innermost diameter 22, 27 of the seal 100, or at the resulting inner circumferential weld 42, the weld zone 50, and subsequent bifurcation 4—4 created at the local bristle skew angle.

Although FIG. 1 of the present invention shows four segments produced by the methods disclosed herein, it is contemplated that any number of segments may be produced by the methods claimed herein as will occur to those skilled in the respective arts and any such resulting configuration of multiple brush seal segments is deemed to be within the scope of the invention as defined by the appended claims. In addition, although this invention is shown having four identical brush seal segments of 90 degree arcs each, additional configurations having segments of various degree-arcs may be produced using the methods of this invention. Furthermore, the objects of the present invention may be applied to static applications, such as the volumetric containment of an oil reservoir.

A method for constructing the segmented brush seal 10 of the present invention is disclosed herewith. According to the present invention, the backing plate 20 is inserted into and retained by a first assembly fixture (not shown). A plurality of bristles 30 are assembled onto the backing plate such that the bristles 30 have a common circumferential skew angle relative to the inner diameter 22 of the backing plate 20. The side plate 25, having a plurality of tabs 32 circumferentially disposed thereabout and extending radially inwardly from the inner diameter 27 of the side plate 25, sandwiches the bristles 30 to the backing plate 20. The bristles 30 initially extend radially outward beyond an outermost plate diameter 24, 29 by approximately 0.030 inches, thereby providing sufficient host material necessary for the subsequent outer circumferential seal weld 40, which forms an initial unitary brush seal configuration. A preselected pressure is applied to the sandwiched elements 20, 30, 25 which are welded together at the outer diameters 24, 29 by an electron beam weld is thereby producing the unitary brush seal. An electron beam weld is further lengthwisely created from the radially inner tab end 34 to the circumferential weld 40, thereby fusing together the plates 20, 25, bristles 30, and tab 32. The resulting weld zone 50 is bifurcated in the manner discussed above and along the local bristle skew angle, whereby a portion of the weld zone is lengthwisely retained by each resulting edge. The resulting edges and faces of the bristles and plates are then trimmed and finished as required.

A particular advantage of this method of fabricating a segmented brush seal results from the creation of a full annular seal from which the segments are cut. By cutting a full seal into segments, distortions warping and other dimensional variations will be avoided or minimized since the segmented seal must always form a full ring when reassembled.

Further modifications and improvements of the invention herein disclosed will occur to those skilled in the respective arts and all such modifications and improvements are deemed to be within the scope of the invention as defined by the appended claims.

We claim:

1. A segmented brush seal comprising:

an annular backing plate having inner and outer diameters and an axial centerline therethrough, an annular side plate having an inner diameter larger than the inner diameter of the backing plate, an outer diameter and an axial centerline therethrough, the plates being coaxial and their outer diameters being substantially equal, the coaxial plates sandwiching a plurality of circumferentially arrayed bristles extending radially inwardly at a constant circumferential skew angle with respect to the side plate, a tab extending radially inwardly from the side plate inner diameter, the backing plate and side plate each comprising:

a plurality of contiguous annular segments each segment delimited by two circumferentially disposed weld zones, each weld zone fusing a cross-section of the sandwiched plates, bristles, and the radially inwardly extending tab, wherein each weld zone lengthwisely extends from a radially inner end of the tab to an outermost diameter of the seal.

2. The brush seal as recited in claim 1, wherein the weld zone extends in a direction substantially parallel to a local bristle skew angle.

3. The claim of claim 1, wherein the tab extends proximate to the inner diameter of the backing plate.

* * * * *